US012571509B2

(12) United States Patent
Patel et al.

(10) Patent No.: US 12,571,509 B2
(45) Date of Patent: Mar. 10, 2026

(54) ADJUSTABLE MODULAR LED LIGHTING SYSTEM

(71) Applicant: HAVELLS LIGHTING LLC, Anderson, SC (US)

(72) Inventors: Ishavarbhai Patel, Pendleton, SC (US); Naveen Kumar, Noida (IN); Himanshu Tyagi, Noida (IN); Pushpraj Giri, Noida (IN); Somsubhra Metia, Noida (IN)

(73) Assignee: HAVELLS LIGHTING LLC, Anderson, SC (US)

( * ) Notice: Subject to any disclaimer, the term of this patent is extended or adjusted under 35 U.S.C. 154(b) by 5 days.

(21) Appl. No.: 18/918,439

(22) Filed: Oct. 17, 2024

(65) Prior Publication Data

US 2025/0129902 A1 Apr. 24, 2025

Related U.S. Application Data

(60) Provisional application No. 63/591,620, filed on Oct. 19, 2023.

(51) Int. Cl.

| | |
|---|---|
| ***F21S 2/00*** | (2016.01) |
| ***F21S 8/00*** | (2006.01) |
| ***F21V 17/16*** | (2006.01) |
| ***F21V 23/00*** | (2015.01) |
| ***F21V 23/04*** | (2006.01) |
| ***F21V 29/70*** | (2015.01) |
| *F21Y 115/10* | (2016.01) |

(52) U.S. Cl.

CPC ............... *F21S 2/005* (2013.01); *F21S 8/036* (2013.01); *F21V 17/166* (2013.01); *F21V 23/009* (2013.01); *F21V 23/04* (2013.01); *F21V 29/70* (2015.01); *F21Y 2115/10* (2016.08)

(58) Field of Classification Search

CPC .... F21Y 2115/10; F21V 23/04; F21V 23/009; F21V 17/166; F21V 29/70; F21S 8/036; F21S 2/005

See application file for complete search history.

(56) References Cited

U.S. PATENT DOCUMENTS 9,212,812 B2 * 12/2015 Kinnune .................. F21V 7/10
10,165,647 B2 * 12/2018 Clark ..................... H05B 45/30
2010/0238671 A1 * 9/2010 Catone .................. F21V 17/107 362/373

FOREIGN PATENT DOCUMENTS

WO WO-2019120229 A1 * 6/2019 ............ F21V 23/009

OTHER PUBLICATIONS

Innovation Q+ NPL Search (Year: 2025).*

* cited by examiner

*Primary Examiner* — Anabel Ton

(74) *Attorney, Agent, or Firm* — Kim and Lahey Law Firm, LLC; Seann P. Lahey

(57) ABSTRACT

The present disclosure relates to a lighting system. The lighting system may include a first housing, a second housing, one or more drivers, and one or more lighting devices. The first housing defines a first hollow portion. The second housing may be pivotably coupled to the first housing and define a second hollow portion opposite to the first hollow portion, such that the first hollow portion and the second hollow portion together define an interior space. Further, the one or more drivers may be disposed in the first hollow portion of the first housing. Moreover, the one or more lighting devices may be disposed in the second hollow portion of the second housing and electrically connected to the one or more drivers.

15 Claims, 12 Drawing Sheets

ADJUSTABLE MODULAR LED LIGHTING SYSTEM

FIELD OF THE INVENTION

The disclosure generally relates to a lighting system. More specifically, the disclosure relates to an adjustable modular Light-emitting diode (LED) lighting system.

BACKGROUND

Generally, lighting assemblies such as Light Emitting Diodes (LEDs) assemblies are equipped in various places such as residential buildings and commercial buildings to generate illumination. Typically, a lighting assembly is a two-piece housing that is formed using an upper member and a lower member joined to the upper member. Further, the lighting assembly includes an LED and an LED driver electrically coupled to the lighting device. Generally, the LEDs and the driver are mounted on the same platform, such as a Printed Circuit Board (PCB) with each other to form a sub-assembly which is disposed in one of the upper member and the lower member.

There are various limitations in the existing light assembly. For instance, the lighting device or the driver of the lighting assembly is required to be replaced or repaired in case of any failure or after prolonged usage. As a result, the complete lighting device needs to be replaced even if one of the lighting devices and the driver are working in proper condition. Further, the existing light assembly includes the driver adapted to be operated at a specific voltage, and the older drivers may no longer be available due to the continuous advancements in light technology. Therefore, it becomes the only option to replace the entire sub-assembly in case of any failure. This increases the time and effort associated with the maintenance of the lighting assembly, which increases the overall maintenance cost.

As explained above, the failure of the driver leads to the replacement of the entire sub-assembly which takes a considerable time. During this time, the failure of the light assembly results in a dark area which may increase crime, risk and liability risk. Additionally, the existing lighting assembly does not have any provision to easily detach the lower member from the upper member to access the lighting device and the driver for maintenance. Therefore, the detaching of the lower member and the upper member consumes more time and effort which makes the detaching of the lower member a cumbersome task.

Therefore, in view of the above-mentioned problems, it is desirable to develop a lighting system that can eliminate one or more above-mentioned problems associated with the existing art.

SUMMARY

This summary is provided to introduce a selection of concepts in a simplified format that are further described in the detailed description of the disclosure. This summary is not intended to identify key or essential inventive concepts of the disclosure, nor is it intended to determine the scope of the disclosure.

The present disclosure relates to a lighting system. The lighting system may include a first housing, a second housing, one or more drivers, and one or more lighting devices. The first housing defines a first hollow portion. The second housing may be pivotably coupled to the first housing and define a second hollow portion opposite to the first hollow portion, such that the first hollow portion and the second hollow portion together define an interior space. Further, the one or more drivers may be disposed in the first hollow portion of the first housing. Moreover, the one or more lighting devices may be disposed in the second hollow portion of the second housing and electrically connected to the one or more drivers.

As explained above, the one or more drivers may be disposed in the first housing and the one or more lighting devices may be disposed in the second housing. Herein, there is only an electrical connection between the one or more drivers or the one or more lighting devices. Thus, the one or more drivers or the one or more lighting devices can be individually repaired or replaced for maintenance purposes or in case of any failure. This reduces the time and effort required in the maintenance of the lighting system, which further reduces the overall cost associated with the maintenance of the lighting system. Therefore, the present disclosure provides a simpler, more efficient and cost-effective lighting system.

In a further advantageous embodiment, a spring-loaded locking mechanism is positioned in the first housing and adapted to releasably lock a distal end of the first housing to a distal end of the second housing in a locked position.

In a further advantageous embodiment, the spring-loaded locking mechanism comprises a fixed member positioned in the first housing; a movable member coupled with the fixed member and adapted to be pressed to move with respect to the fixed member to unlock the second housing from the first housing in an open position; and a resilient member coupled with the movable member to provide a resilient force to the movable member.

In a further advantageous embodiment, a plurality of fastening members are adapted to mount each lighting device in the second housing.

In a further advantageous embodiment, a support plate is positioned in the first housing, below the one or more drivers, and adapted to mount the one or more drivers.

In a further advantageous embodiment, the support plate defines a U-shape.

In a further advantageous embodiment, each lighting device comprises a heat sink adapted to absorb heat dissipated by the respective lighting device.

In a further advantageous embodiment, each driver comprises a heat sink adapted to absorb heat dissipated by the respective driver.

In a further advantageous embodiment, the second housing comprises a plurality of openings adapted to accommodate the one or more lighting devices.

In a further advantageous embodiment, a support rail is disposed along an inner peripheral surface of the first housing and adapted to mount the one or more drivers in the first housing.

In a further advantageous embodiment, a position selector is mounted on an inner peripheral surface of the second housing and has a plurality of slots. Further, a first support member is pivotally coupled to the support rail and the position selector of the second housing and adapted to guide the movement of the second housing with respect to the first housing between the open position and the locked position.

In a further advantageous embodiment, the first support member comprises a first end pivotally coupled to the support rail, and a second end opposite to the first end. The second end defines a prong adapted to be engaged with a slot from among the plurality of slots, of the position selector, to guide the movement of the second housing.

In a further advantageous embodiment, a second support member is pivotally coupled to the first housing and the support plate accommodating the one or more drivers, and is adapted to guide the movement of the support plate with respect to the first housing.

In a further advantageous embodiment, the second support member comprises a primary end pivotally coupled with the first housing; and a secondary end opposite to the primary end and pivotally coupled to the first housing and the support plate to guide the movement of the support plate with respect to the first housing.

In a further advantageous embodiment, a control unit is positioned in the first housing and adapted to switch-ON or switch-OFF the one or more lighting devices.

In a further advantageous embodiment, an adjustable mounting bracket is coupled with the first housing and is adapted to adjust a pivoting angle of the first housing relative to a mounting platform.

To further clarify the advantages and features of the method and system, a more particular description of the method and system will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Figure 1:
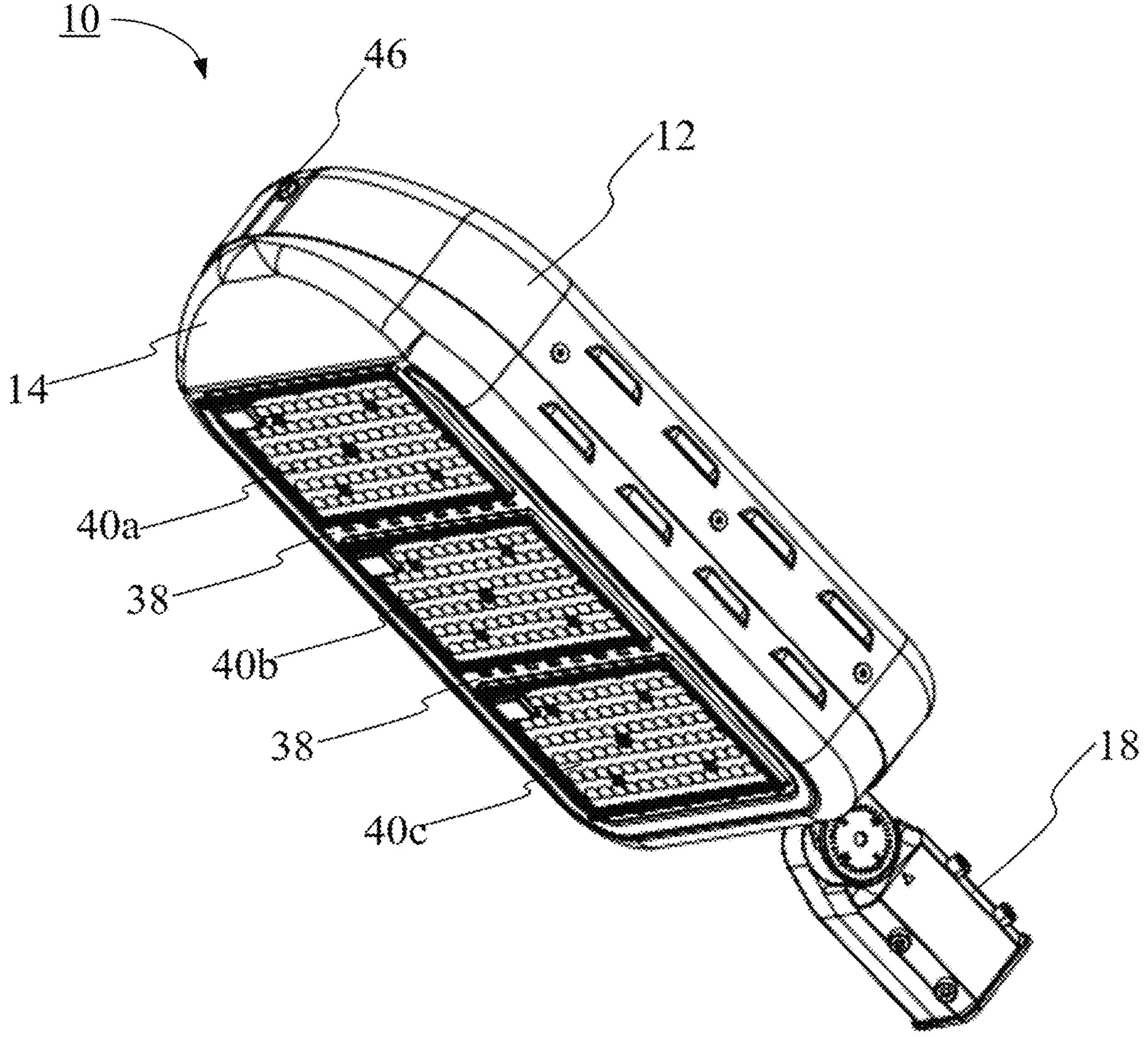
FIG. 1 illustrates a perspective view of an adjustable modular Light-emitting diode (LED) lighting system, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to “an aspect”, “another aspect” or similar language means that a particular feature, structure, or characteristic described in connection with the embodiment is included in at least one embodiment of the disclosure. Thus, appearances of the phrase “in an embodiment”, “in another embodiment”, “some embodiments”, “one or more embodiments” and similar language throughout this specification may, but do not necessarily, all refer to the same embodiment.

The terms “comprises”, “comprising”, or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by “comprises . . . a” does not, without more constraints, preclude the existence of other devices or other sub-systems or other elements or other structures or other components or additional devices or additional sub-systems or additional elements or additional structures or additional components.

Embodiments of the disclosure will be described below in detail with reference to the accompanying drawings.

Figure 2:
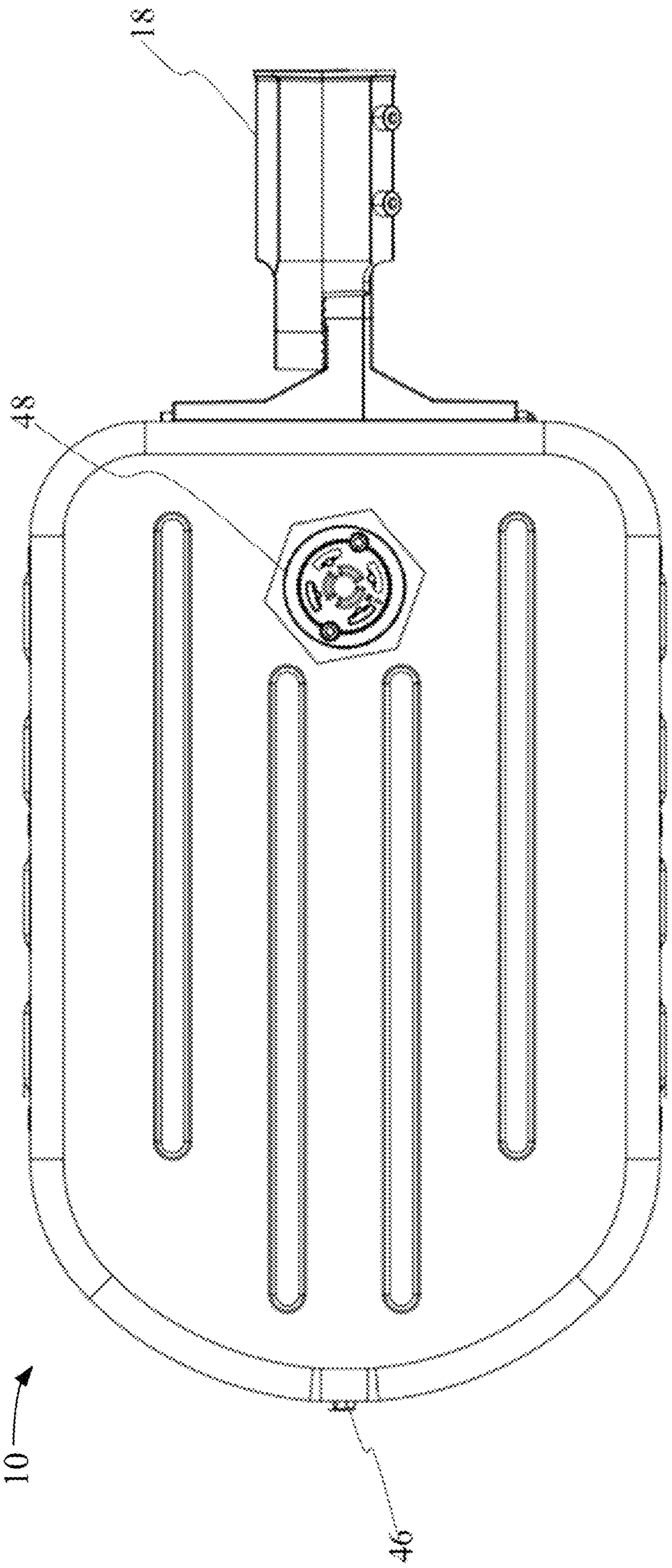
FIG. 2 illustrates a top view of the adjustable modular LED lighting system, according to an embodiment of the present disclosure.
Figure 3A:
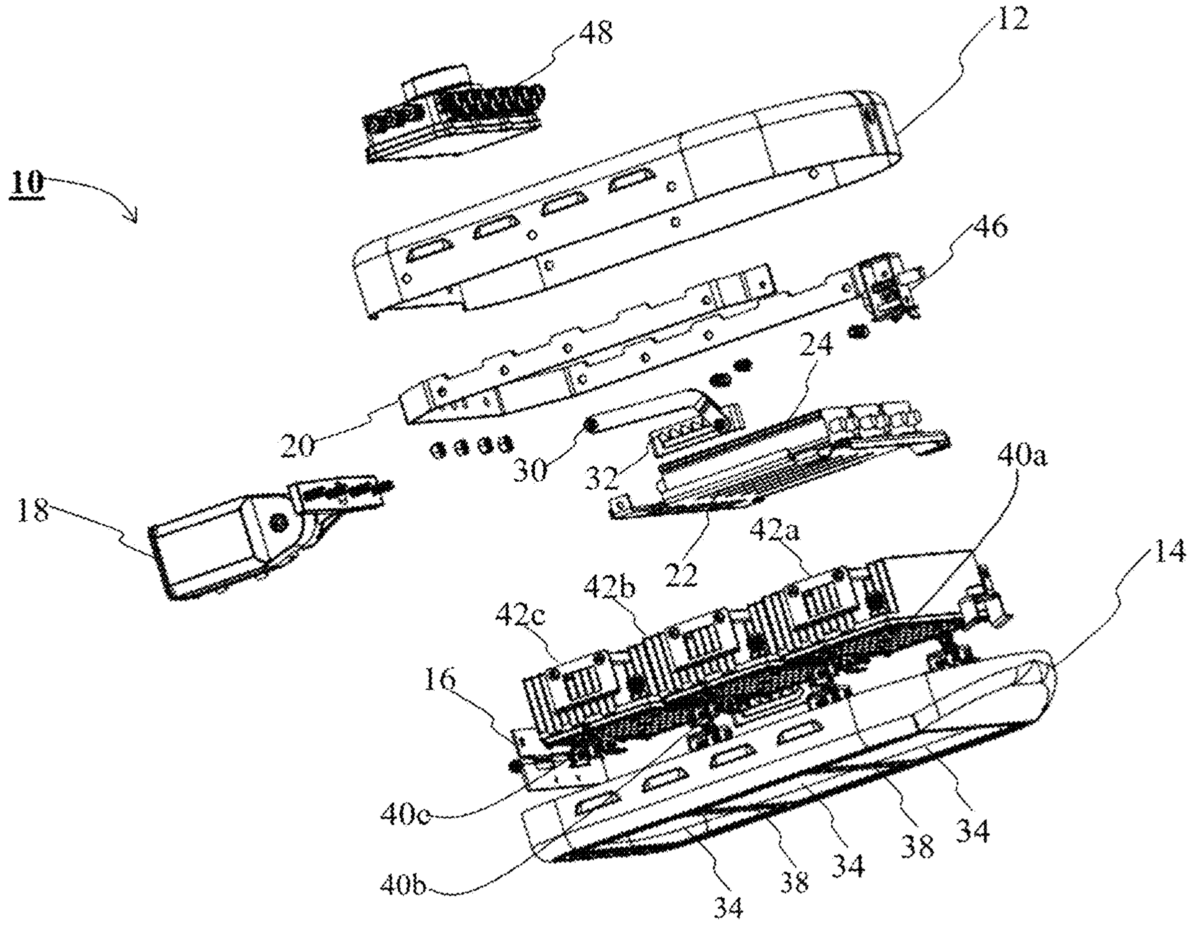
FIG. 3A illustrates an exploded view of the adjustable modular LED lighting system, according to an embodiment of the present disclosure.
Figure 3B:
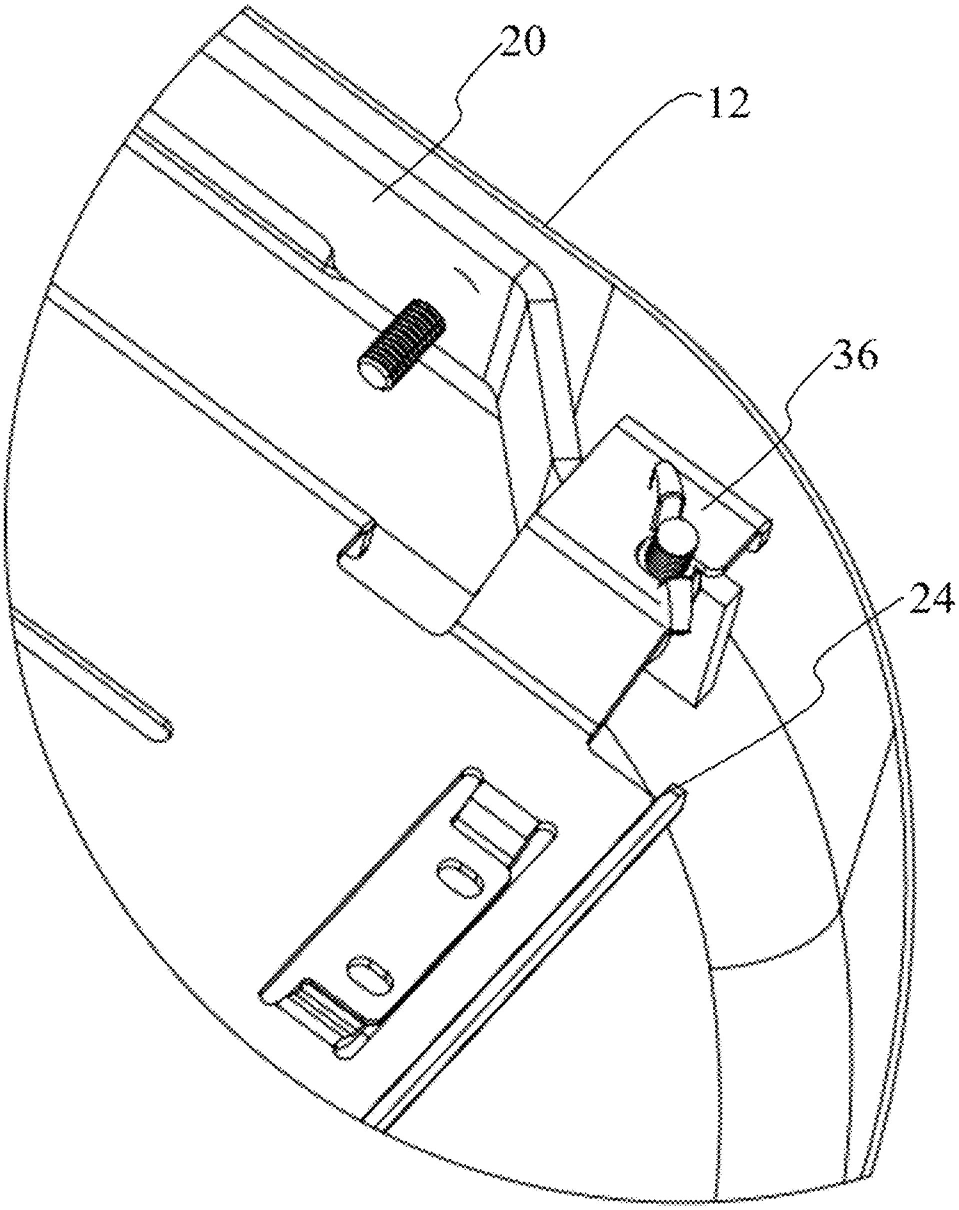
FIG. 3B illustrates a partial perspective of a first housing of the adjustable modular LED lighting system, according to an embodiment of the present disclosure.

FIG. 1 illustrates a perspective view of an adjustable modular Light-emitting diode (LED) lighting system 10, according to an embodiment of the present disclosure. FIG. 2 illustrates a top view of the adjustable modular LED lighting system 10, according to an embodiment of the present disclosure. FIG. 3A illustrates an exploded view of the adjustable modular LED lighting system 10, according to an embodiment of the present disclosure. FIG. 3B illustrates a partial perspective view of a first housing 12 of the adjustable modular LED lighting system 10, according to an embodiment of the present disclosure.

Referring to FIGS. 1, 2 and 3A-B, the adjustable modular LED lighting system 10 may be installed at various places such as residential buildings and commercial buildings to generate illumination. In a non-limiting embodiment, the adjustable modular LED lighting system 10 may be installed in parking lots, streets or pathways to generate illumination for one or more vehicles and/or one or more pedestrians. In another embodiment, the adjustable modular LED lighting system 10 may be embodied as a linear high bay installed in warehouses, gymnasiums, or large indoor spaces, to generate uniform illumination from greater heights. For the sake of readability, in the subsequent paragraphs, the adjustable modular LED lighting system 10 may be interchangeably referred to as the lighting system 10, without departing from the scope of the present disclosure.

In one embodiment, the lighting system 10 may be embodied as a full cutoff wall pack to generate the illumination in a downward direction, such that light spillage and light pollution may be prevented by ensuring that no light is emitted above a horizontal plane. In another embodiment, the lighting system 10 may be embodied as a semi-cutoff wall pack to produce the light dispersion above the horizontal plane. In yet another embodiment, the lighting system 10 may be embodied as a canopy light that can be installed under canopy areas to generate the targeted illumination to ensure bright and shadow-free lighting.

The lighting system 10 may be adapted to mount on a mounting platform. In an embodiment, the mounting platform may be a pole or a wall, without departing from the scope of the present disclosure. Herein, the lighting system 10 may be adapted to adjust relative to the mounting platform. Such adjustments may be performed to achieve efficient illumination.

In an example, the lighting system 10 may be adjusted to generate more focused and far-reaching illumination when the lighting system 10 is installed in the streets. In an embodiment, the lighting system 10 may include, but is not limited to, one or more motion sensors adapted to sense the motion of one or more objects or pedestrians in the surrounding environment. Thus, the lighting system 10 may be adjusted based on the motion sensing.

In an embodiment, the lighting system 10 may include, but is not limited to, the first housing 12, the second housing 14, an adjustable mounting bracket 18, one or more drivers 24, one or more lighting devices 40*a*, 40*b*, 40*c*, and a spring-loaded locking mechanism 46. The first housing 12 defines a first hollow portion. Herein, the one or more drivers 24 may be disposed in the first hollow portion of the first housing 12. In an embodiment, each driver 24 comprises a heat sink 24*a* (best shown in FIG. 8) adapted to absorb a heat dissipated by the respective driver 24.

In the illustrated embodiment, the one or more drivers 24 may include three drivers 24 connected with the one or more lighting devices 40*a*, 40*b*, 40*c* and adapted to supply power to the one or more lighting devices 40*a*, 40*b*, 40*c*. In another embodiment, the single driver 24 may be connected with the one or more lighting devices 40*a*, 40*b*, 40*c* to supply power to the one or more lighting devices 40*a*, 40*b*, 40*c*. Herein, each driver 24 may include an input voltage indicator and an output voltage indicator for troubleshooting purposes. In a non-limiting embodiment, all LED panels include an LED power indicator for quick troubleshooting.

The first housing 12 may be embodied as an upper housing, without departing from the scope of the present disclosure. In an embodiment, the first housing 12 may be formed of a polymeric material. In another embodiment, the first housing 12 may be formed of a metallic material.

The adjustable mounting bracket 18 may be coupled with the first housing 12. In an embodiment, the adjustable mounting bracket 18 may be coupled to the first housing 12 via a plurality of fasteners. Herein, the adjustable mounting bracket 18 may be adapted to facilitate the mounting of the lighting system 10 on the mounting platform.

Further, the adjustable mounting bracket 18 may be adapted to adjust a pivoting angle of the first housing 12 relative to the mounting platform, such that the lighting system 10 may be adjusted relative to the mounting platform to adjust the illumination. In an embodiment, the adjustable mounting bracket 18 may be formed of a polymeric material. In another embodiment, the adjustable mounting bracket 18 may be formed of a metallic material.

The second housing 14 may be pivotably coupled to the first housing 12 via a hinge 16. In an embodiment, the second housing 14 may have a shape identical to the shape of the first housing 12, such that the first housing 12 may be coupled with the second housing 14. The second housing 14 defines a second hollow portion opposite to the first hollow portion, such that the first hollow portion and the second hollow portion together define an interior space. The second hollow portion may be adapted to accommodate the one or more lighting devices 40*a*, 40*b*, 40*c*.

The one or more lighting devices 40*a*, 40*b*, 40*c* may be disposed in the second hollow portion of the second housing 14. Herein, the one or more lighting devices 40*a*, 40*b*, 40*c* may be electrically connected to the one or more drivers 24 via one or more connectors 44 (shown in FIG. 7B)). In an embodiment, each lighting device 40*a*, 40*b*, 40*c* may include a heat sink 42*a*, 42*b*, 42*c* adapted to absorb the heat dissipated by the respective lighting device 40*a*, 40*b*, 40*c*. In an embodiment, each lighting device 40*a*, 40*b*, 40*c* may be embodied as a Light Emitting Diode (LED), without departing from the scope of the present disclosure. In an embodiment, the one or more lighting devices 40*a*, 40*b*, 40*c* may have generated the illumination in different colors.

Figure 5:
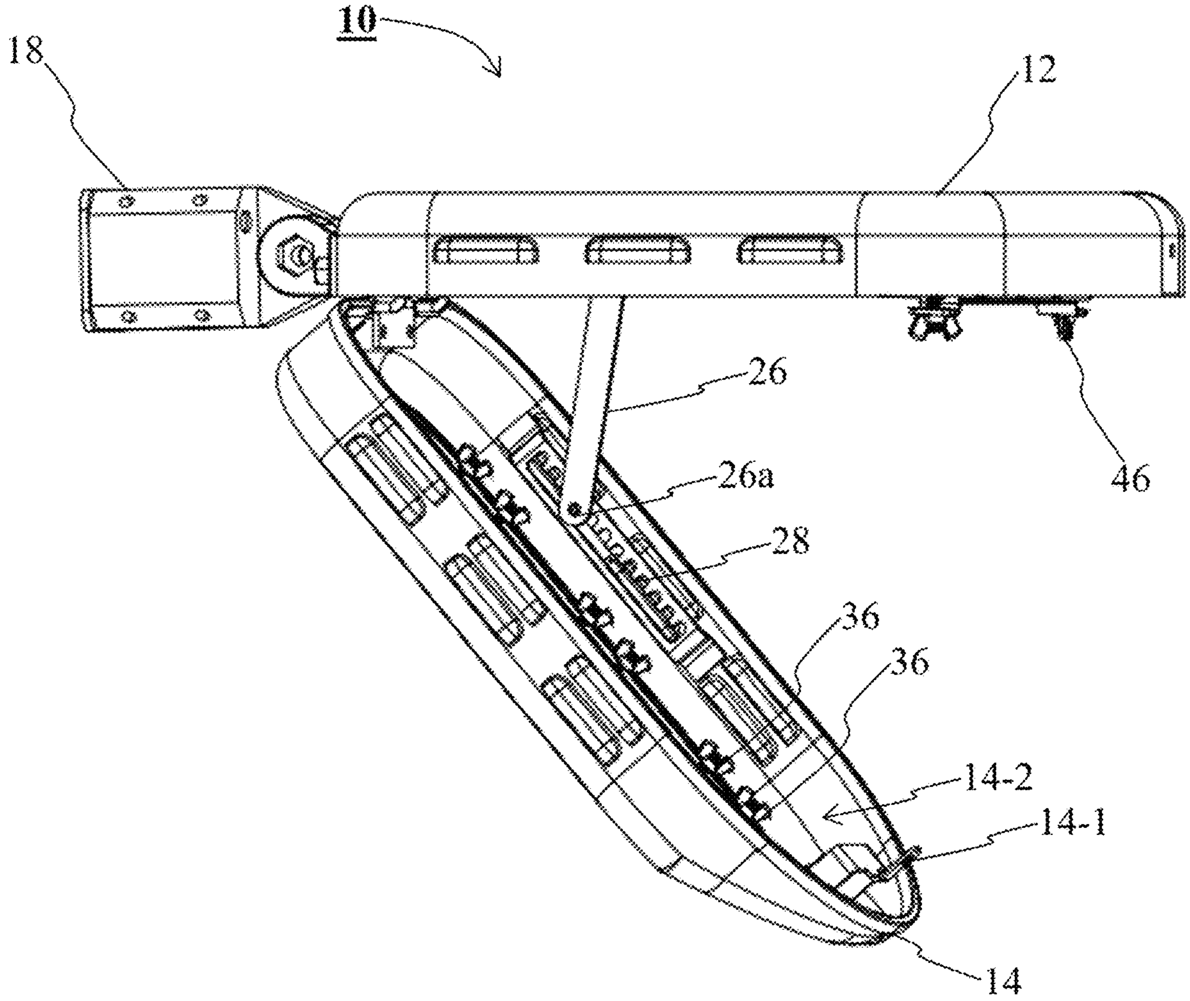

As shown in FIGS. 3A and 5, the lighting system 10 may include a plurality of fastening members 36 adapted to mount each lighting device 40*a*, 40*b*, 40*c* in the second housing 14. In the illustrated embodiment, as shown in FIG. 3B, the fastening member 36 is securing support plate 22 within the first housing 12. In an embodiment, the plurality of fastening members 36 may be embodied as a plurality of wing nuts 36, without departing from the scope of the present disclosure. The implementation of the plurality of wing nuts 36 facilitates the easy mounting of each lighting device 40*a*, 40*b*, 40*c* in the second housing 14, and the support plate 22 in the first housing 12.

Further, the second housing 14 may include a plurality of openings 34 adapted to accommodate the one or more lighting devices 40*a*, 40*b*, 40*c*. Herein, the second housing 14 may include a plurality of cross brace members 38 attached to a surface of the second housing 14 to form the plurality of openings 34. The plurality of cross brace members 38 may be adapted to support the one or more lighting devices 40*a*, 40*b*, 40*c* positioned in the plurality of openings 34.

In an embodiment, the plurality of openings 34 may correspond to the one or more lighting devices 40*a*, 40*b*, 40*c*. In the illustrated embodiment, the second housing 14 includes three openings 34 adapted to accommodate three lighting devices 40*a*, 40*b*, 40*c*, without departing from the scope of the present disclosure. Herein, each opening 34 may be adapted to accommodate a lighting device from among the one or more lighting devices 40*a*, 40*b*, 40*c*. The installation of each lighting device 40*a*, 40*b*, 40*c* in the respective opening 34 facilitates the replacement of individual lighting devices 40*a*, 40*b*, 40*c* for maintenance purposes.

The second housing 14 may include an inner peripheral surface 14-2 defining the plurality of openings 34. The peripheral surface may be adapted to receive a lens (not shown). In an embodiment, the lens may be attached to the inner peripheral surface 14-2 of the second housing 14 via a plurality of fasteners. In another embodiment, the lens may be attached to the inner peripheral surface 14-2 via adhesives. In one more embodiment, the lens may be attached to the inner peripheral surface 14-2 via one of a plastic welding process, or a plurality of snap locks. In an embodiment, a single lens may be attached to the inner peripheral surface 14-2 to cover the plurality of openings 34.

In another embodiment, the plurality of lenses may be attached to the inner peripheral surface 14-2 to cover the plurality of openings 34. In an embodiment, the second housing 14 may be embodied as a lower housing 14, without departing from the scope of the present disclosure. In an embodiment, the second housing 14 may be formed of a polymeric material. In another embodiment, the second housing 14 may be formed of a metallic material.

Figure 4:
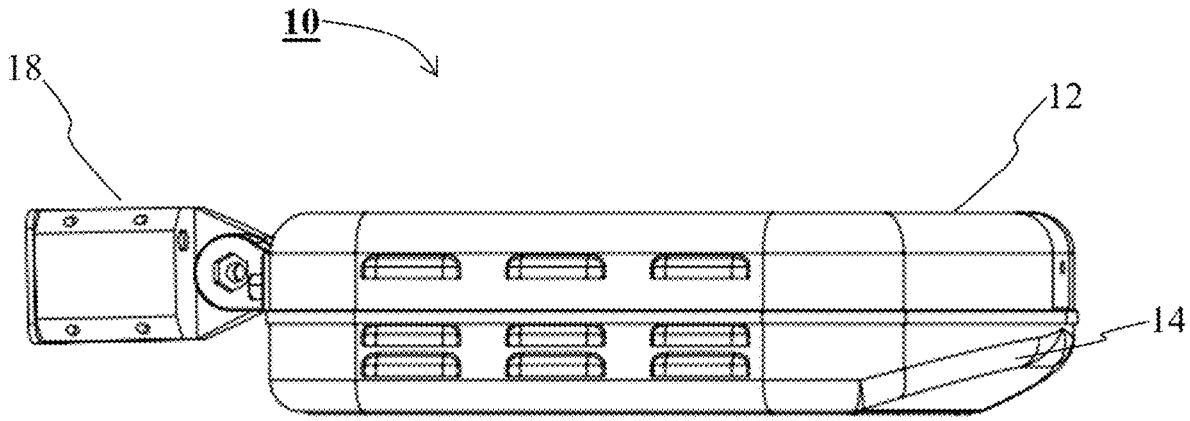
FIGS. 4 and 5 illustrate side views of the adjustable modular LED lighting system depicting a locked position and an open position of the adjustable modular LED lighting system, respectively, according to an embodiment of the present disclosure.
Figure 6:
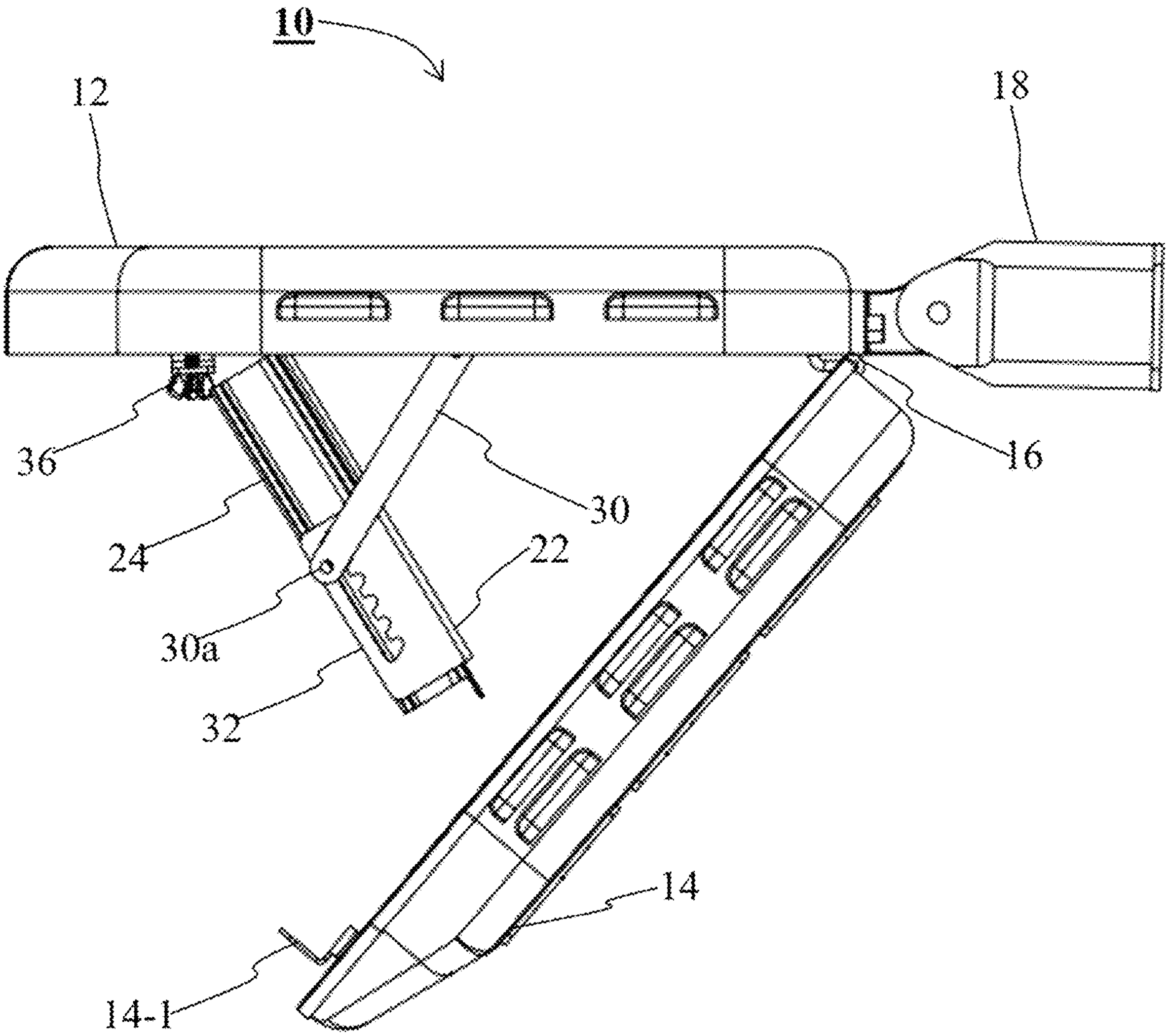
FIGS. 6 and 7A illustrate different side views of the adjustable modular LED lighting system depicting the one or more drivers, a support plate, and a second support member in the open position of the adjustable modular LED lighting system, according to an embodiment of the present disclosure.
Figure 7A:
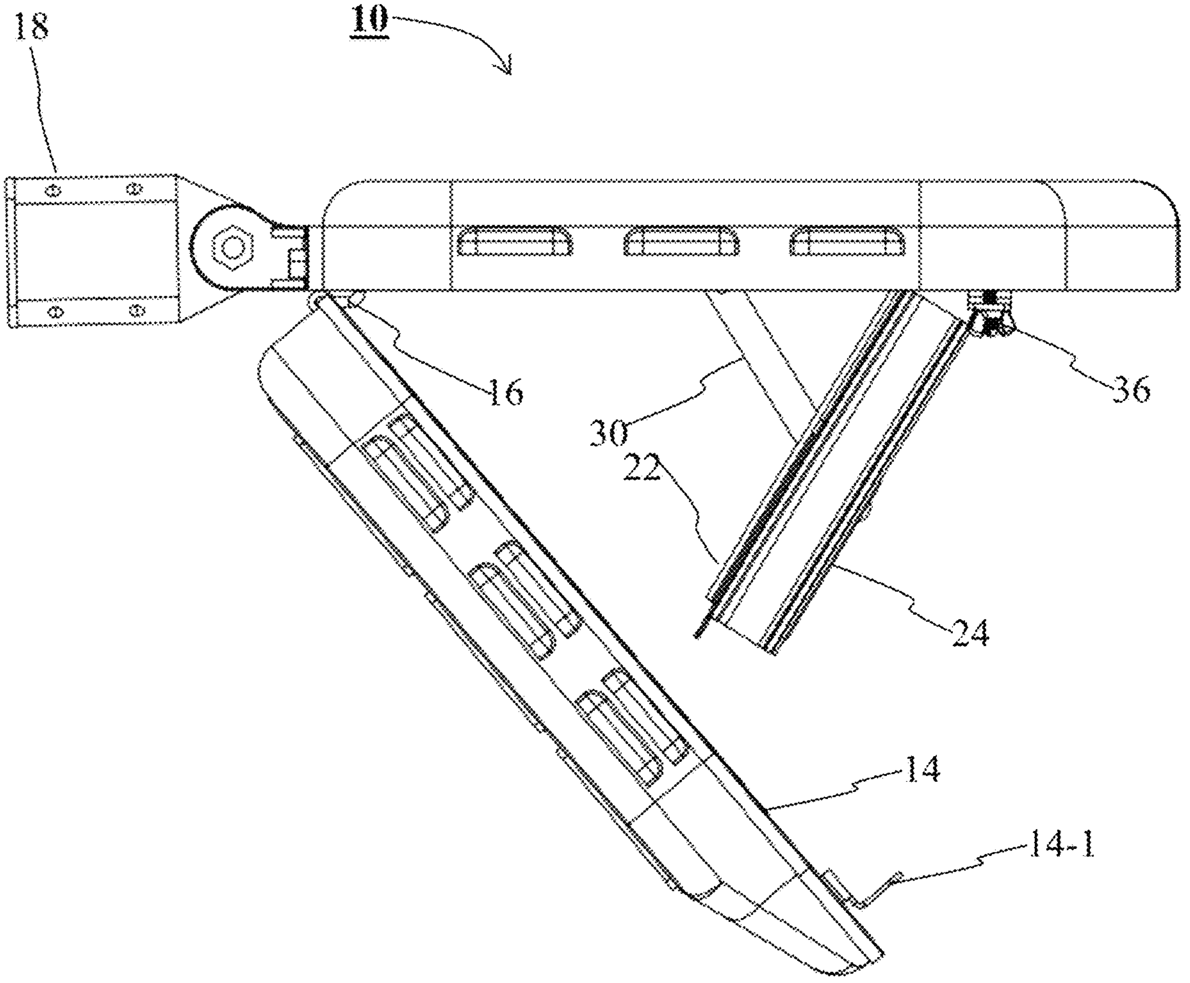
Figure 7B:
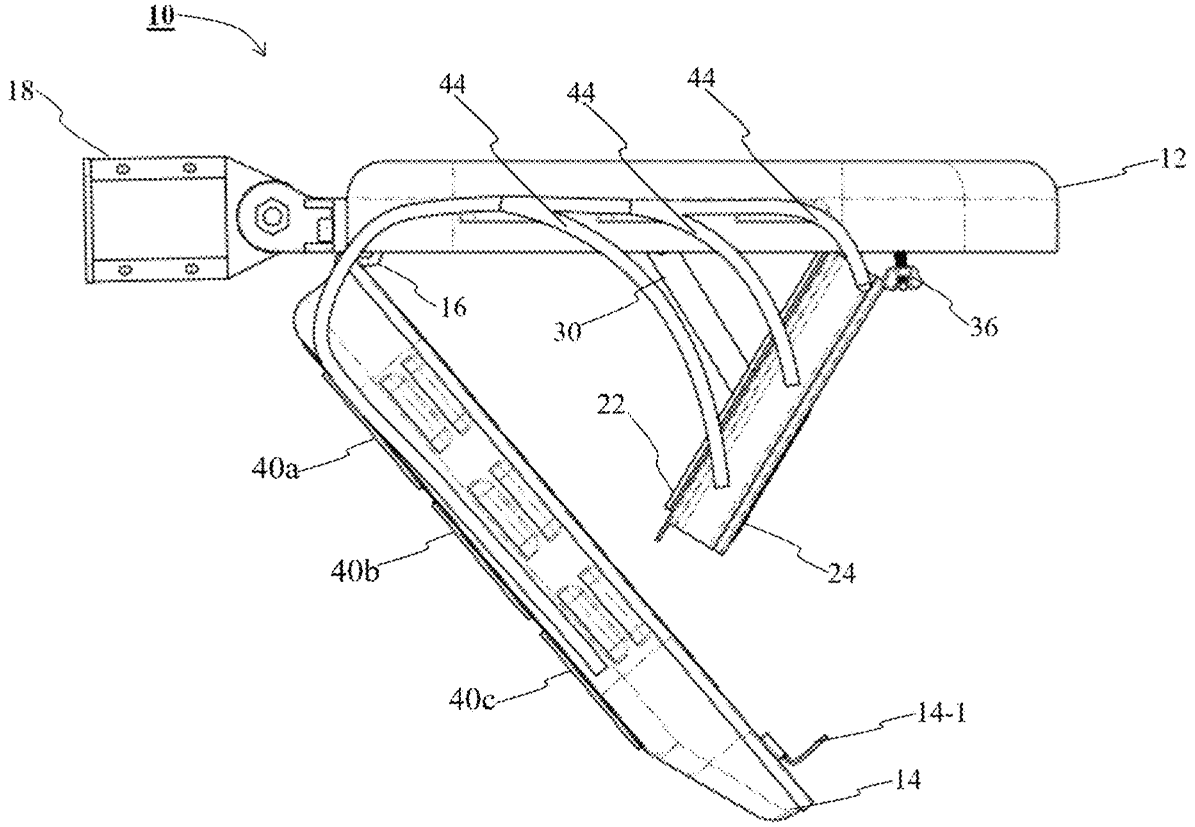
FIG. 7B illustrates a side view of the adjustable modular LED lighting system depicting an electrical connection between the one or more drivers and the one or more lighting devices, according to an embodiment of the present disclosure.
Figure 8:
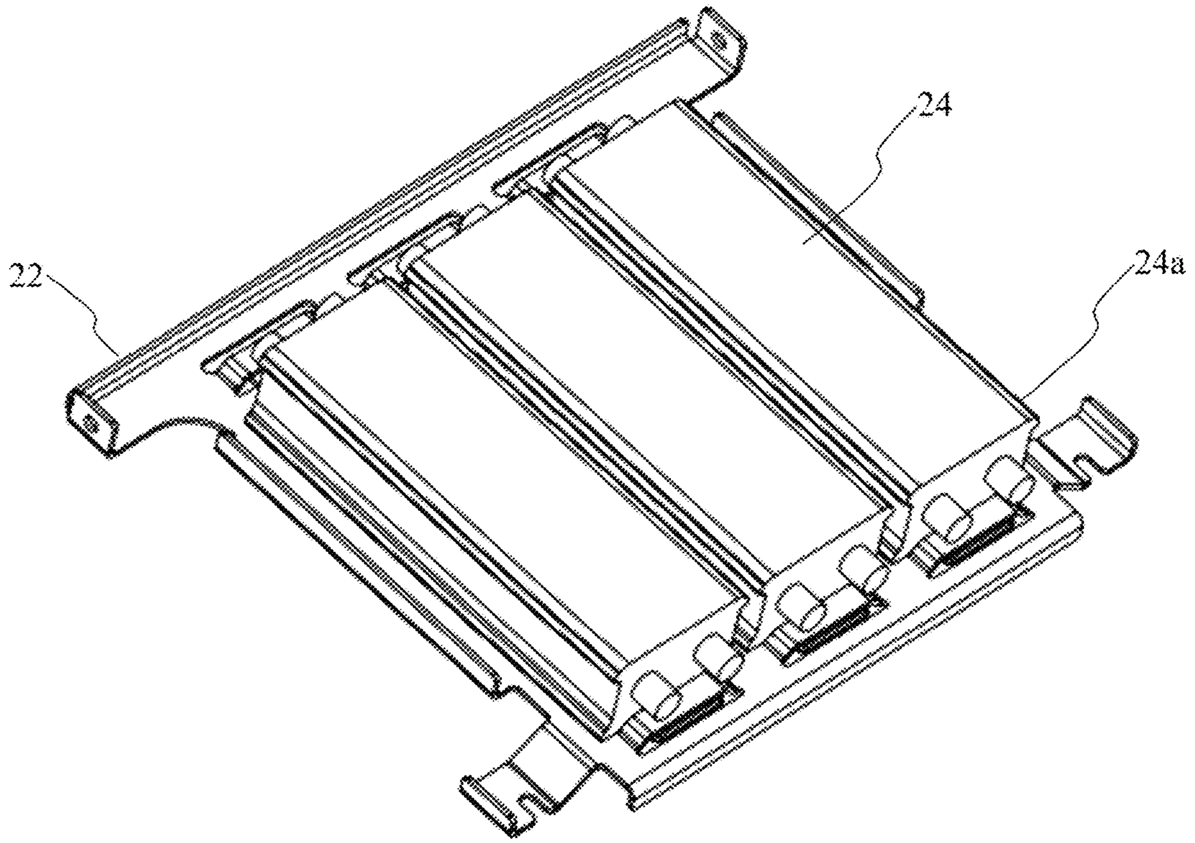
FIG. 8 illustrates a perspective view of the one or more drivers of the adjustable modular LED lighting system, according to an embodiment of the present disclosure.

FIGS. 4 and 5 illustrate side views of the adjustable modular LED lighting system 10 depicting a locked position and an open position of the adjustable modular LED lighting system 10, respectively, according to an embodiment of the present disclosure. FIGS. 6 and 7A illustrate different side views of the adjustable modular LED lighting system 10 depicting the one or more drivers 24, a support plate 22, and a second support member 30 in the open position of the adjustable modular LED lighting system 10, according to an embodiment of the present disclosure. FIG. 7B illustrates a side view of the adjustable modular LED lighting system 10 depicting an electrical connection between the one or more drivers 24 and the one or more lighting devices 40*a*, 40*b*, 40*c*, according to an embodiment of the present disclosure. FIG. 8 illustrates a perspective view of the one or more drivers 24 of the adjustable modular LED lighting system 10, according to an embodiment of the present disclosure.

Referring to FIGS. 4, 5, 6, 7A-B and 8, the second housing 14 may be adapted to be moved with respect to the first housing 12 between the open position and the locked position to provide easy access to one or more components accommodated within the first housing 12 and the second housing 14. In the locked position, as shown in FIG. 4, the second housing 14 may be engaged with the first housing 12. In the open position, as shown in FIG. 5, the second housing 14 may be pivotally moved away from the first housing 12.

The lighting system 10 may include the support plate 22, a support rail 20 (best shown in FIGS. 3A and 3B), a position selector 28, and a first support member 26. The support plate 22 may be positioned in the first housing 12, below the one or more drivers 24. Herein, the support plate 22 may be adapted to mount the one or more drivers 24. In an embodiment, the support plate 22 may have a U-shape, without departing from the scope of the present disclosure. Further, the support plate 22 may be pivotally mounted on a pair of distal end portions of the support rail 20.

The support rail 20 may be disposed along an inner peripheral surface of the first housing 12. In an embodiment, the support rail 20 may abut the inner peripheral surface of the first housing 12. The support rail 20 may be adapted to mount the one or more drivers 24 in the first housing 12. In an embodiment, the support rail 20 may have a U-shape, without departing from the scope of the present disclosure. In an embodiment, the support rail 20 may be adapted to provide structural rigidity to the first housing 12. The support rail 20 may be adapted to provide one or more mounting locations for the components of the lighting system 10.

The position selector 28 may be mounted on an inner peripheral surface of the second housing 14 and include a plurality of slots. The first support member 26 may be pivotally coupled to the support rail 20 and the position selector 28 of the second housing 14. The first support member 26 may be adapted to guide the movement of the second housing 14 with respect to the first housing 12 between the open position and the locked position.

In an embodiment, the first support member 26 may include a first end and a second end. The first end may be pivotally coupled to the support rail 20. The second end may be opposite to the first end. The second end defines a prong 26*a* adapted to be engaged with a slot from among the plurality of slots, of the position selector 28, to guide the movement of the second housing 14. Herein, the engagement of the prong 26*a* and the position selector 28 may restrict the opening of the second housing 14 at a specific position.

Referring to the illustrated embodiment shown in FIGS. 6 and 7, the lighting system 10 may include the second support member 30 and a position adjuster 32. The second support member 30 may be pivotally coupled to the first housing 12 and the support plate 22 for accommodating the one or more drivers 24. The second support member 30 may be adapted to guide the movement of the support plate 22 with respect to the first housing 12.

In an embodiment, the second support member 30 may include a primary end and a secondary end opposite to the primary end. The primary end may be pivotally coupled with the first housing 12. Further, the secondary end may be pivotally coupled to the position adjuster 32 and the support plate 22 to guide the movement of the support plate 22 with respect to the first housing 12. Herein, the secondary end defines the prong 30*a* adapted to be engaged with the position adjuster 32, such that the movement of the support plate 22 with respect to the first housing 12 can be guided.

As shown in FIG. 8, the one or more drivers 24 may be arranged in series to form a sub-assembly, such that the one or more drivers 24 can be easily mounted on the support plate 22. Further, the support plate 22 may be pivotally mounted in the first housing 12. The one or more drivers 24 may be electrically connected to the one or more lighting devices 40*a*, 40*b*, 40*c* via the one or more connectors 44, as shown in FIG. 7B. Herein, the one or more connectors 44 may be adapted to establish the electrical connection between the one or more drivers 24 and the one or more lighting devices 40*a*, 40*b*, 40*c*. Thus, the one or more drivers 24 and the one or more lighting devices 40*a*, 40*b*, 40*c* are physically separated. The implementation of the one or more connectors 44 makes the connection and disconnection of the one or more drivers 24 and the one or more lighting devices 40*a*, 40*b*, 40*c* easy and quick.

Figure 9:
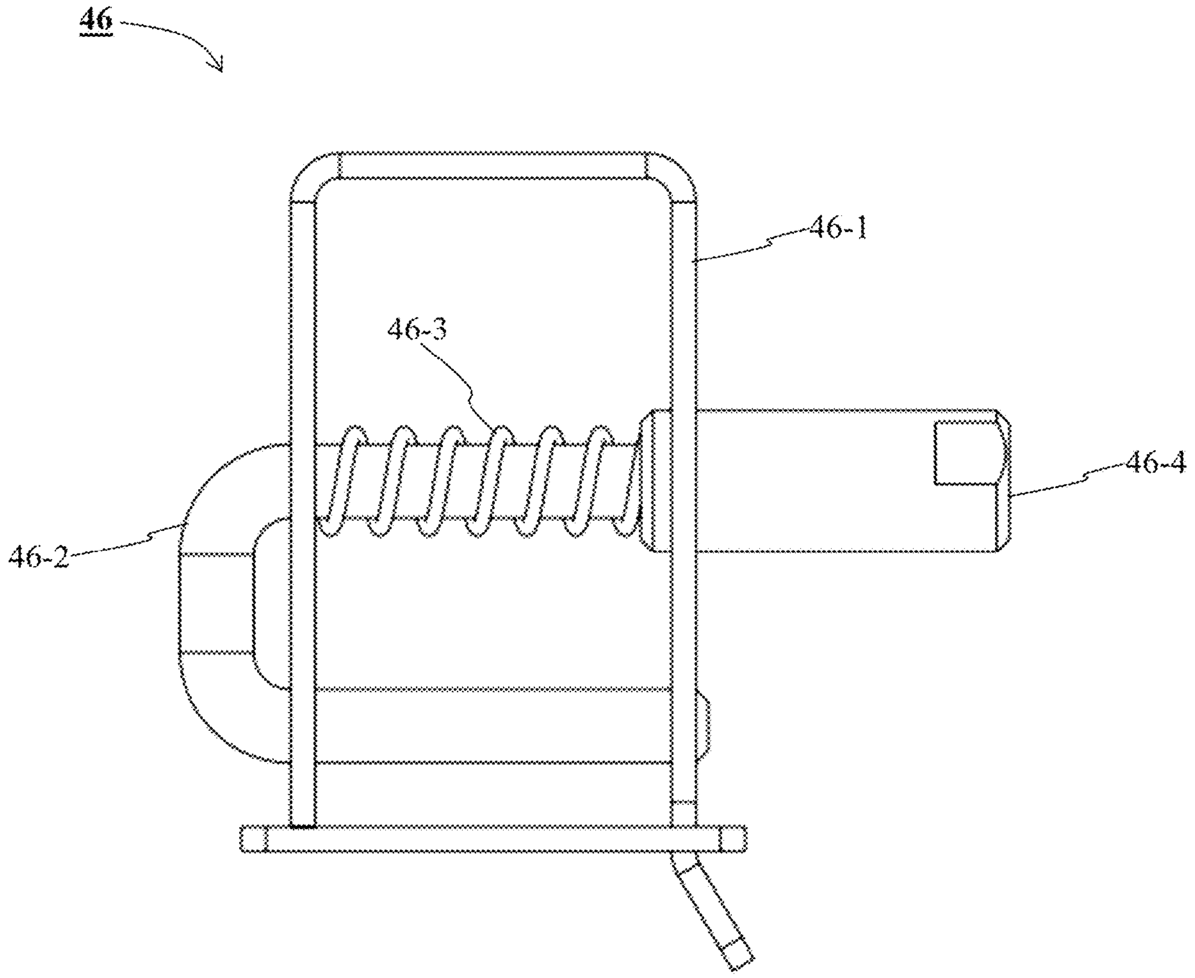
FIG. 9 illustrates a side view of a spring-loaded locking mechanism of the adjustable modular LED lighting system, according to an embodiment of the present disclosure.

FIG. 9 illustrates a side view of the spring-loaded locking mechanism 46 of the adjustable modular LED lighting system 10, according to an embodiment of the present disclosure. With further reference to FIGS. 3A, 5, and 7, the spring-loaded locking mechanism 46 may be positioned in the first housing 12. Herein, the spring-loaded locking mechanism 46 may be adapted to releasably lock a distal end of the first housing 12 to a distal end of the second housing 14 in the locked position. In an embodiment, the spring-loaded locking mechanism 46 may be adapted to prevent unauthorized access to the first housing 12 and the second housing 14.

In an embodiment, the spring-loaded locking mechanism 46 may include a fixed member 46-1, a movable member 46-2, and a resilient member 46-3. The fixed member 46-1 may be positioned in the first housing 12. The movable member 46-2 may be coupled with the fixed member 46-1. The movable member 46-2 is arranged to releasably engage a catch portion 14-1 carried by second housing 14.

The movable member 46-2 may be adapted to be pressed to move with respect to the fixed member 46-1 to unlock the second housing 14 from the first housing 12 in an open position. In an embodiment, the movable member 46-2 defines a knob 46-4 adapted to be pressed by a user to move the movable member 46-2.

With the movement of the movable member 46-2, catch portion 14-1 of the second housing 14 may be released by the spring-loaded locking mechanism 46. This allows the movement of the second housing 14 towards the open position, away from the first housing 12. Further, the resilient member 46-3 may be coupled with the movable member 46-2 to provide a resilient force to the movable member 46-2.

The lighting system 10 may include a control unit 48 positioned in the first housing 12 and adapted to switch-ON or switch-OFF the one or more lighting devices 40*a*, 40*b*, 40*c*. Herein, the one or more lighting devices 40*a*, 40*b*, 40*c* may be switched ON or switched OFF based on one or more environmental conditions. For example, the one or more lighting devices 40*a*, 40*b*, 40*c* may be switched ON during the sunset and the one or more lighting devices 40*a*, 40*b*, 40*c* may be switched OFF at sunrise.

In the illustrated embodiment, the control unit 48 may be exposed from an external surface of the first housing 12. In an embodiment, the control unit 48 may include a pair of wire sensors communicatively coupled with a base station via a wired or wireless network, such that the lighting system 10 can be remotely operated.

Figure 10C:
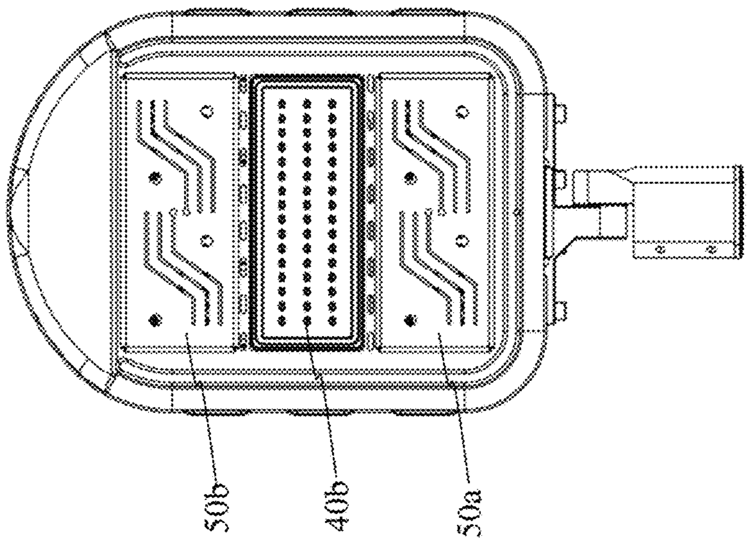
FIGS. 10*a*, 10*b* and 10*c* illustrate front views of the adjustable modular LED lighting system, according to an embodiment of the present disclosure.
Figure 10B:
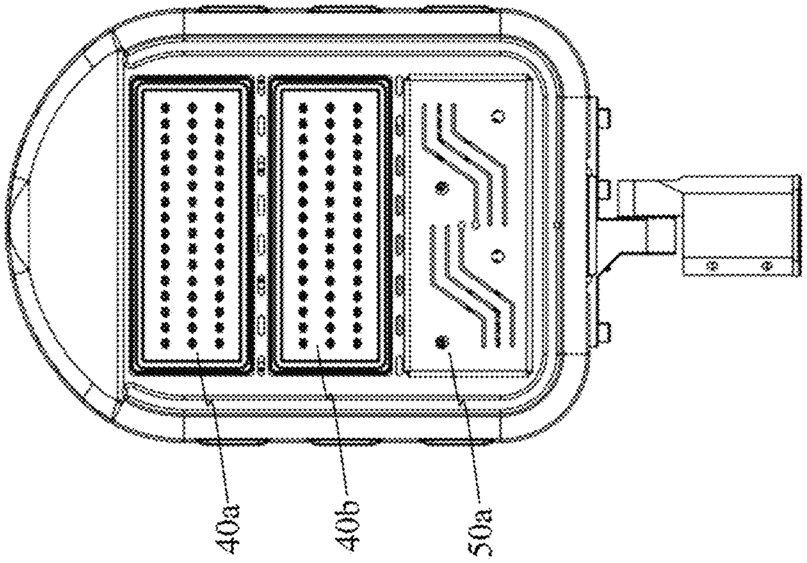
Figure 10A:
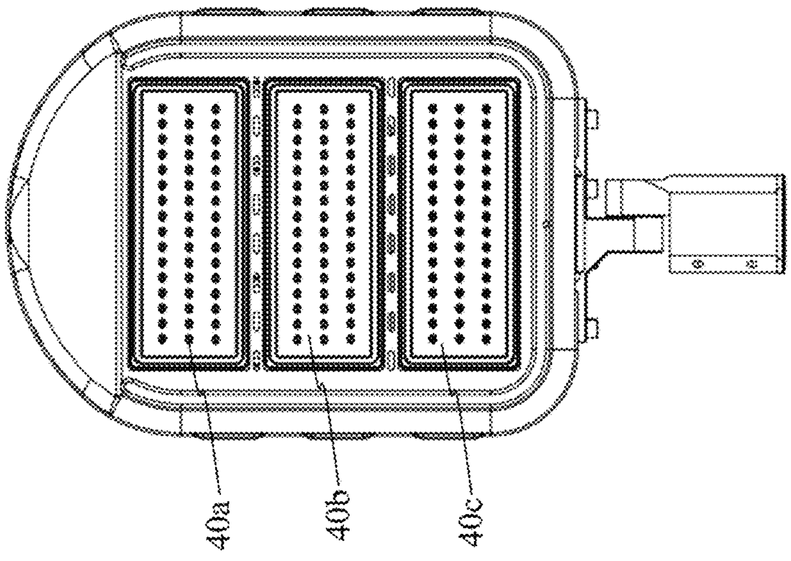

FIGS. 10*a*, 10*b*, and 10*c* illustrate front views of the adjustable modular LED lighting system 10, according to an embodiment of the present disclosure. In an exemplary embodiment, as shown in FIG. 10*a*, the lighting system 10 may include three lighting devices 40*a*, 40*b*, 40*c* installed to generate illumination. Herein, the lighting system 10 may be adapted to be operated at a predefined power of 300-350 W. As shown in FIG. 10*b*, the lighting system 10 may include two lighting devices 40*a*, 40*b*, and a decorative panel 50*a*. The decorative panel 50*a* may act as a placeholder in place of the lighting device 40*c*. Herein, the lighting system 10 may be adapted to be operated at a predefined power of 200-250 W.

As shown in FIG. 10*c*, the adjustable modular LED lighting system 10 may include a lighting device 40*a* and two decorative panels 50*a*, 50*b*. The decorative panels 50*a*, 50*b* may act as placeholders in place of the lighting devices 40*a*, 40*c*. Herein, the lighting system 10 may be adapted to be operated at a predefined power of 100-120 W. Thus, the lighting system 10 of the present disclosure may be operated with different powers.

In the present disclosure, the lighting system 10 includes the one or more drivers 24 disposed in the first housing 12, and the one or more lighting devices 40*a*, 40*b*, 40*c* disposed in the second housing 14. Herein, there is only an electrical connection between the one or more drivers 24 or the one or more lighting devices 40*a*, 40*b*, 40*c*. Thus, the one or more drivers 24 or the one or more lighting devices 40*a*, 40*b*, 40*c* can be individually repaired or replaced for maintenance purposes or in case of any failure. This reduces the time and effort required in the maintenance of the lighting system 10, which further reduces the overall cost associated with the maintenance of the lighting system 10. Therefore, the present disclosure provides a simpler, more efficient, flexible, and cost-effective lighting system 10.

As would be apparent to a person in the art, various working modifications may be made to the method in order to implement the inventive concept as taught herein. Moreover, the actions of any flow diagram need not be implemented in the order shown; nor do all the acts necessarily need to be performed. Also, those acts that are not dependent on other acts may be performed in parallel with the other acts. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Benefits, other advantages, and solutions to problems have been described above regarding specific embodiments. However, the benefits, advantages, solutions to problems, and any component(s) that may cause any benefit, advantage, or solution to occur or become more pronounced are not to be construed as a critical, or essential feature or component of any or all the claims.

What is claimed is:

1. A lighting system, comprising:
- a first housing defining a first hollow portion;
- a second housing pivotably coupled to the first housing and defining a second hollow portion opposite to the first hollow portion, such that the first hollow portion and the second hollow portion together define an interior space;
- one or more drivers disposed in the first hollow portion of the first housing; and
- one or more lighting devices disposed in the second hollow portion of the second housing and electrically connected to the one or more drivers.

2. The lighting system of claim 1, comprising a spring-loaded locking mechanism positioned in the first housing and adapted to releasably lock a distal end of the first housing to a distal end of the second housing in a locked position.

3. The lighting system of claim 2, wherein the spring-loaded locking mechanism comprises:
- a fixed member positioned in the first housing;
- a movable member coupled with the fixed member and adapted to be pressed to move with respect to the fixed member to unlock the second housing from the first housing in an open position; and
- a resilient member coupled with the movable member to provide a resilient force to the movable member.

4. The lighting system of claim 1, comprising a plurality of fastening members adapted to mount each lighting device in the second housing.

5. The lighting system of claim 1, comprising a support plate positioned in the first housing, below the one or more drivers, and adapted to mount the one or more drivers.

6. The lighting system of claim 5, wherein the support plate defines a U-shape.

7. The lighting system of claim 1, wherein each lighting device comprises a heat sink adapted to absorb heat dissipated by the respective lighting device.

8. The lighting system of claim 1, wherein each driver comprises a heat sink adapted to absorb heat dissipated by the respective driver.

9. The lighting system of claim 1, wherein the second housing comprises a plurality of openings adapted to accommodate the one or more lighting devices.

10. The lighting system of claim 1, comprising a support rail disposed along an inner peripheral surface of the first housing and adapted to mount the one or more drivers in the first housing.

11. The lighting system of claim 10, comprising:

a position selector mounted on an inner peripheral surface of the second housing and having a plurality of slots; and a first support member pivotally coupled to the support rail and the position selector of the second housing and adapted to guide the movement of the second housing with respect to the first housing between the open position and the locked position.

12. The lighting system of claim 11, wherein the first support member comprises:

a first end pivotally coupled to the support rail; and a second end opposite to the first end and defining a prong adapted to be engaged with a slot from among the plurality of slots, of the position selector, to guide the movement of the second housing.

13. The lighting system of claim 5, comprising a second support member pivotally coupled to the first housing and the support plate accommodating the one or more drivers, and adapted to guide the movement of the support plate with respect to the first housing.

14. The lighting system of claim 1, comprising a control unit positioned in the first housing and adapted to switch-ON or switch-OFF the one or more lighting devices.

15. The lighting system of claim 1, comprising:

an adjustable mounting bracket coupled with the first housing and adapted to adjust a pivoting angle of the first housing relative to a mounting platform.

* * * * *